July 8, 1924.    1,500,967

F. F. THOMSEN

DIRECTION SIGNAL FOR VEHICLES

Filed Aug. 23, 1922    2 Sheets-Sheet 1

Inventor
F. F. Thomsen.
By Arthur H. Sturges.
Attorney

July 8, 1924.  1,500,967
F. F. THOMSEN
DIRECTION SIGNAL FOR VEHICLES
Filed Aug. 23, 1922   2 Sheets-Sheet 2

Inventor
F. F. Thomsen.
By Arthur H. Sturges.
Attorney

Patented July 8, 1924.

1,500,967

UNITED STATES PATENT OFFICE.

FRED F. THOMSEN, OF OMAHA, NEBRASKA.

DIRECTION SIGNAL FOR VEHICLES.

Application filed August 23, 1922. Serial No. 583,792.

*To all whom it may concern:*

Be it known that I, FRED F. THOMSEN, a citizen of the United States, residing at Omaha, in the county of Douglas and State of Nebraska, have invented certain new and useful Improvements in Direction Signals for Vehicles, of which the following is a specification.

The present invention relates to improvements in direction signals for vehicles and has for an object to provide an indicating member adapted to be supported, for instance, from the side of an automobile and having a pivotal movement to enable the indicator to be shifted to a variety of positions for showing proposed changes in direction or to announce the intention of the driver to hault the vehicle.

Other objects of the invention are to simplify the construction of signals of this class, to provide a signal which is easily and conveniently operated and yet will not occupy a great amount of room in the vehicle; which is capable of being attached to existing vehicle constructions without requiring change or alteration therein; and to provide a signal which will be illuminated at night only upon its movement from an initial or origin position.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a longitudinal section taken through a signal device constructed according to the present invention.

Figure 6:
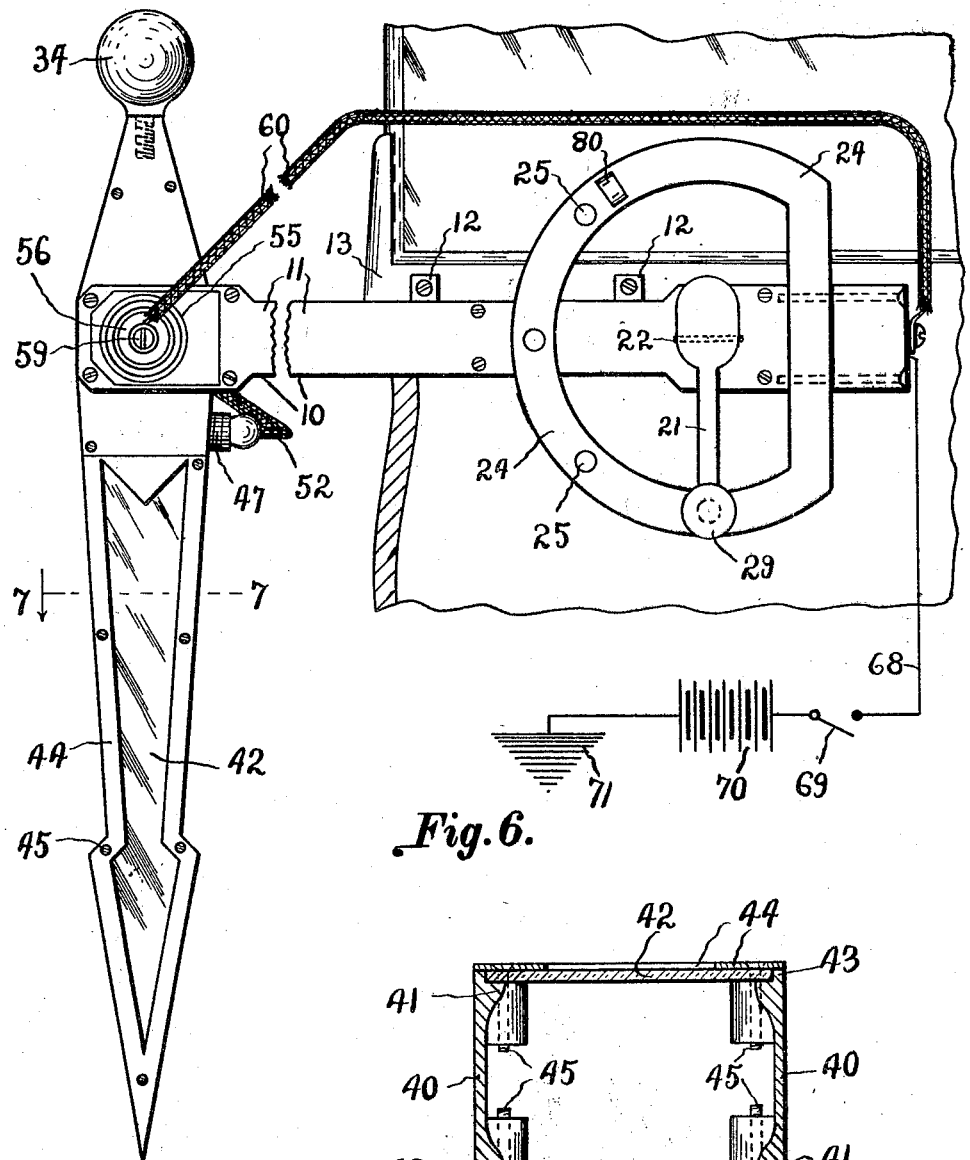
Figure 6 is a side view of the signal shown in place in a vehicle.

Referring more particularly to the drawings, 10 designates a tubular frame open at one side and having a cover plate 11 secured thereover as by bolts or screws indicated in Figure 6. The frame 10 is provided with lugs 12 by which it is secured to the dash board 13 of the vehicle indicated in Figure 6.

Within the hollow frame 10 is a shaft 15 journalled in bearings 14 and having fixed thereon, as by a set screw 17 a bevel pinion 16. The pinion 16 lies at a short distance from the inner end of the shaft 15 and is adapted to mesh with a similar beveled pinion 16' fixed upon a stub shaft 19 journalled through a boss 18 extending from the cover of the casing. The shaft 19 projects beyond the boss 18 where it carries a lug 20 forming an abutment for a spring 23 which bears against one end of an arm 21, tending to rock the arm about a pivot point 22 by which it is secured to the outer end of the stub shaft 19. The pin 22 also serves to couple the stub shaft and the arm together. The arm is directed toward the housing and carries an operating handle 27 in the shape of the long bolt having the reduced ends 26 adapted to fit into any one of four angularly displaced perforations or sockets 25 carried upon the rim of a segment 24. The segment may form a part of the cover 11 or be secured thereto by suitable means. The bolt handle 27 is secured as by the nuts 28 to the arm 21 and at its outer end a head 29 upon the bolt serves to facilitate the grasp of the driver. A stop 80 is fixed upon the segment 24 just beyond the last perforation or socket 25 in order to limit the rotary movement of the arm 21.

Now the outer end of the operating shaft 15 carries a beveled pinion 30 in mesh with a similar beveled pinion 31 fixed upon a tubular cross shaft 32 journalled in appropriate bearings and having fixed on one projecting end an indicating member 33 taking the form of an arrow and having a counter weighted end 34 to balance it and to restore it to a vertical position in which the arrow points directly upward.

Figure 7:
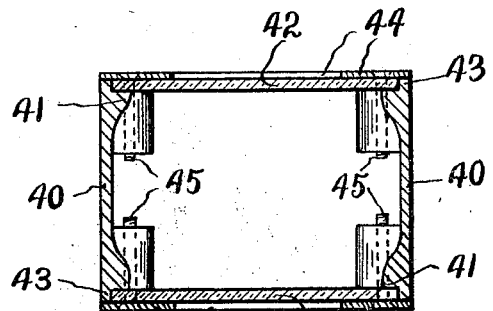
Figure 7 is a cross section taken on the line 7—7 in Figure 6.

The indicating member is hollow within and is constructed as shown in Figure 7 in which 40 indicates the sides of the member which are closed and 41 designates a shoulder which is set in from the opposite open sides to receive the glass panels 42. Frames 44 are secured as by screws 45 over the glass panels to hold the same in place. The ends of the glass abut against shoulders 43 so that the glass is adequately confined on all sides.

The indicating member so formed is slipped over the hollow shaft 48 and is secured as by a nut 50.

The indicating member is illuminated by a lamp 46 threaded or otherwise secured through one of the side walls 40 and for this purpose having a threaded socket 47. The lamp is grounded in this way upon the indicating member and is supplied with current through a lead 52 which is secured over the end of a rod 49 which passes through the hollow shaft 48 and is insulated therefrom as by a hollow sleeve 48'. An insulating ring 51 fits over one end of the rod 49 in order to space the terminal 52 from the metal shaft 32. A nut 53 serves to hold the terminal 52 in place.

At the opposite end of the hollow shaft 32, an insulating cup or casing 56 is threaded into a boss 55 providing a portion of a housing for the gears and to this casing is secured as by a binding screw 59 the leads 60. A coil spring 57 is interposed in the casing between the binding screw and the end of the shaft 49 and serves to make firm contact at all times.

Figure 1:
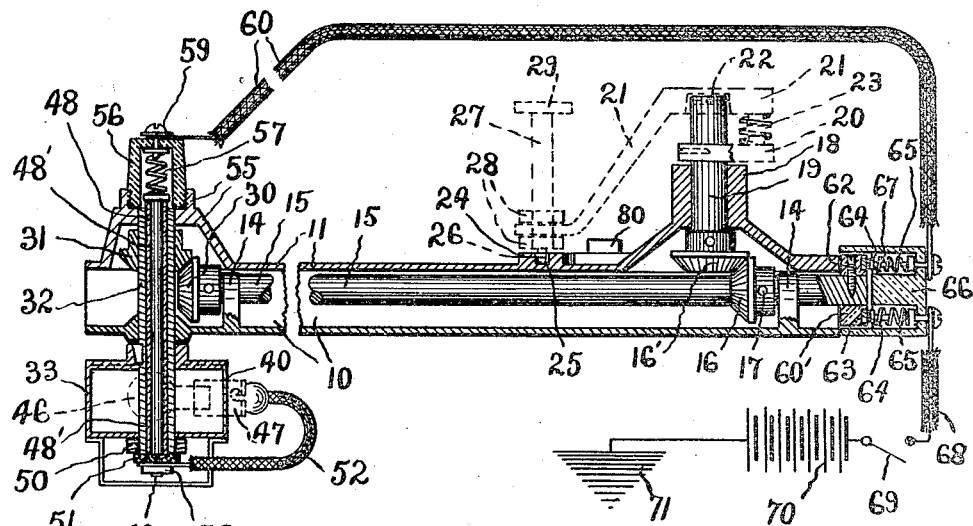
Figure 2:
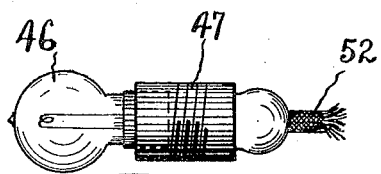
Figure 2 is a plan view of the lamp employed.
Figure 3:
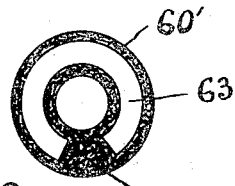
Figure 3 is a face view of the commutator ring and insulating adjacent parts.
Figure 4:
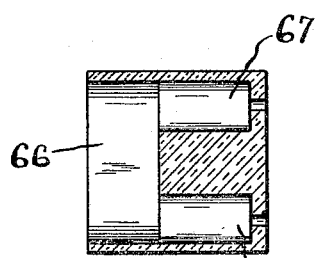
Figure 4 is a longitudinal section through the commutator casing.
Figure 5:
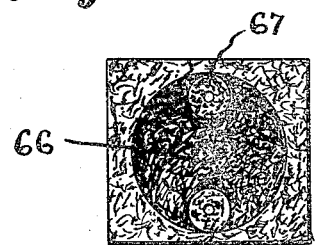
Figure 5 is a internal end view thereof.

Now this lead 60 extends to the shell or casing 66 of the commutator as shown in Figures 1 and 3. The comutator consists of a block of insulating material 60' secured as by a set screw 62 to the inner end of the operating shaft 15 and having embodied therein a conducting ring 63. The ring is continuous except for the blank insulation $x$ which is the origin point. The casing 66 is of fiber or some other insulating material and is provided with chambers 67 in which to receive the two contacts 64 urged by springs 65 toward the conductor ring 63.

One of the contacts 64 is coupled to the lead 60 as shown in Figure 1, while the other contact is connected by a conductor 68 to a battery 70 which is grounded as indicated at 71 and provided with a switch 69 for use in cutting out the lamp during day time use of the signal.

In the operation of the device, the signal normally occupies a position with the arrow point directly upward and the weight 34 downwardly. This is the initial position and under these circumstances the commutator blank insulated portion $x$ shown in Figure 3 is upon one of the contacts 64 so that the circuit is open and the lamp 36 is dark. Now supposing the driver of the vehicle intends to turn toward the left at the next street intersection; then just before arriving at the intersection he will grasp the bolt 27 upon the operating arm 21 and by the use of the bolt head 29 will first withdraw the lower end of the bolt from the socket 25 which at that time occupies, this being permitted by the swinging of the arm 21 upon the pivot pin 22. When the arm is thus freed from this latch construction, the arm may be turned to an appropriate position for instance to cause the arrow point to descend into a horizontal position pointing toward the left, whereby the operating device will have arrived at another one of the perforations 25 and by releasing his grasp the operator allows the spring 23 to force the latch end 26 of the bolt 27 into such perforation and the arrow is thereby left suspended until again manually shifted.

In this way the arrow point may be moved to either right or left horizontal positions to indicate turning in corresponding directions, or the arrow may be caused to point downwardly as in Figure 6 in which it may be assumed that the vehicle is to be brought to a stop or slowed down. Now in case the switch 69 is closed which is also done at night, the movement of the arrow from the initial position will cause both contacts 64 of the commutator to engage the conducting ring 63 and consequently current may flow from the battery 70 to the lamp through the rod 49 and the other electrical connections hereinabove described.

The lamp will therefore be illuminated at all times except when the arrow or pointer is restored to its initial or origin position. A single lamp 46 employed will furnish adequate illumination for the arrow and will be clearly observable through the panels 42 which are also given the formation of an arrow.

It will be appreciated from the foregoing that I have provided a simple, compact and efficient direction signal for automobiles and other vehicles in which the operation will be convenient and quickly effected and in which a clearly discernible index is provided for daylight use and adequate illumination furnished for after dark signalling.

It is obvious that various changes and modifications may be made in the details of construction and design of the above specifically described embodiment of this invention without departing from the spirit thereof, such changes and modifications being restricted only by the scope of the following claim.

What is claimed is:

A vehicle signal comprising a tubular housing, a shaft journaled therein and having one end projecting beyond said housing, means for selectively rotating said shaft in opposite directions, a tubular cross shaft driven by said first named shaft, a signal element fixed to said tubular cross shaft and being hollow, illuminating means contained within said hollow signal element, a conducting rod passing in insulated relation through said hollow cross shaft, a lead connecting the outer end of said rod with said illuminating means, a housing at the back of said cross shaft, a resiliently pressed contact member in said housing bearing against said rod, a casing secured to the end of the first mentioned shaft which projects beyond said housing, said casing being tubular and having a stem axially therein projecting from one end of the casing to an intermediate point therein, resiliently pressed contact fingers carried at opposite sides of said stem, and a conducting ring having insulated portions carried fixedly by said shaft and received in the end of the casing not occupied by said stem, a source of electricity connected to one of said resiliently pressed contact fingers, and a lead connecting the other contact finger in said casing with the spring pressed contact element bearing against said conducting rod.

In testimony whereof, I have affixed my signature in presence of two witnesses.

FRED F. THOMSEN.

Witnesses:
ARTHUR H. STURGES,
HIRAM A. STURGES.